(12) United States Patent
Bednar et al.

(10) Patent No.: US 7,188,425 B2
(45) Date of Patent: *Mar. 13, 2007

(54) RECIPROCATING SAW

(75) Inventors: Thomas Richard Bednar, Pewaukee, WI (US); Roger Dean Neitzell, North Prairie, WI (US); Michael Scott Steele, Germantown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/052,123

(22) Filed: Feb. 7, 2005

(65) Prior Publication Data

US 2005/0132583 A1 Jun. 23, 2005

Related U.S. Application Data

(60) Continuation of application No. 09/892,096, filed on Jun. 26, 2001, now Pat. No. 6,851,193, which is a division of application No. 09/133,728, filed on Aug. 13, 1998, now Pat. No. 6,249,979.

(51) Int. Cl.
*B27B 9/02* (2006.01)

(52) U.S. Cl. .......................... 30/377; 30/375
(58) Field of Classification Search .......... 30/375, 30/377, 392, 394, 262, 374; 403/323
See application file for complete search history.

(56) References Cited

U.S. PATENT DOCUMENTS

| 2,190,156 A | 2/1940 | Junghans |
| 2,673,630 A | 3/1954 | Axtell |
| 2,722,137 A | 11/1955 | Russell |
| 2,793,661 A | 5/1957 | Olson |
| 3,206,989 A | 9/1965 | Enders |
| 3,236,111 A | 2/1966 | Naslund |
| 3,289,798 A | 12/1966 | Gehrie |
| 3,360,021 A | 12/1967 | Mejia |
| 3,388,728 A | 6/1968 | Riley, Jr. et al. |
| 3,461,732 A | 8/1969 | Gregory |
| 3,496,972 A | 2/1970 | Rees |
| 3,627,389 A | 12/1971 | Foote, Jr. et al. |
| 3,945,120 A | 3/1976 | Ritz |
| 3,971,132 A | 7/1976 | Griffies et al. |
| 4,137,632 A | 2/1979 | Pfanzer |
| 4,235,017 A | 11/1980 | Yavis |
| 4,238,884 A | 12/1980 | Walton, II |
| 4,240,204 A | 12/1980 | Walton, II et al. |

(Continued)

FOREIGN PATENT DOCUMENTS

CA 693682 9/1964

(Continued)

*Primary Examiner*—Boyer D. Ashley
*Assistant Examiner*—Omar Flores Sánchez
(74) *Attorney, Agent, or Firm*—Michael Best & Friedrich LLP

(57) ABSTRACT

An reciprocating saw comprising a housing, a motor, a spindle movably supported within said housing and having a front end adapted to support a saw blade, a drive assembly, and an adjustable shoe assembly. The adjustable shoe assembly includes a shoe, a shoe support member pivotally supporting the shoe, a locking member pivotally supported by the housing, and a lever connected to the locking member.

13 Claims, 6 Drawing Sheets

U.S. PATENT DOCUMENTS

| | | | |
|---|---|---|---|
| 4,255,858 A | 3/1981 | Getts | |
| 4,318,224 A | 3/1982 | Getts | |
| 4,379,362 A | 4/1983 | Getts | |
| 4,385,443 A | 5/1983 | O'Banion | |
| 4,449,062 A | 5/1984 | Wilson | |
| 4,550,501 A | 11/1985 | Moores, Jr. et al. | |
| 4,628,605 A | 12/1986 | Clowers | |
| 4,893,994 A | 1/1990 | Copp | |
| 4,962,588 A | 10/1990 | Fushiya et al. | |
| 4,991,818 A | 2/1991 | Darbo et al. | |
| 5,007,172 A * | 4/1991 | Palm | 30/377 |
| 5,009,012 A | 4/1991 | Martinez et al. | |
| 5,025,562 A | 6/1991 | Palm | |
| 5,050,307 A | 9/1991 | Palm | |
| 5,079,844 A | 1/1992 | Palm | |
| 5,083,376 A | 1/1992 | Lentino | |
| 5,212,887 A | 5/1993 | Farmerie | |
| 5,322,302 A | 6/1994 | Quirijnen | |
| D352,218 S | 11/1994 | Nygards | |
| 5,392,519 A | 2/1995 | Inoue et al. | |
| 5,421,091 A | 6/1995 | Gerritsen, Jr. | |
| 5,450,925 A | 9/1995 | Smith et al. | |
| 5,479,711 A | 1/1996 | Hathcock | |
| RE35,258 E | 6/1996 | Palm | |
| 5,555,626 A | 9/1996 | Fuchs | |
| 5,566,458 A | 10/1996 | Bednar | |
| 5,598,636 A | 2/1997 | Stolzer | |
| 5,607,023 A | 3/1997 | Palm | |
| 5,687,483 A | 11/1997 | Neubert et al. | |
| 5,725,058 A | 3/1998 | Eriksson | |
| RE35,878 E | 8/1998 | Kimura et al. | |
| 5,819,420 A | 10/1998 | Collins | |
| 5,839,347 A | 11/1998 | Nomura et al. | |
| 5,855,070 A | 1/1999 | Grabowski | |
| 5,954,140 A | 9/1999 | Bauer | |
| 5,987,758 A * | 11/1999 | McCurry et al. | 30/392 |
| 6,068,405 A | 5/2000 | Harris et al. | |
| 6,113,832 A | 9/2000 | Tanaka et al. | |
| 6,209,208 B1 | 4/2001 | Marinkovich et al. | |
| 6,249,979 B1 | 6/2001 | Bednar et al. | |
| 6,263,979 B1 | 7/2001 | Dyke et al. | |
| 6,272,757 B1 * | 8/2001 | Roe | 30/377 |
| 6,282,797 B1 | 9/2001 | Osada et al. | |
| 6,851,193 B2 | 2/2005 | Bednar et al. | |

FOREIGN PATENT DOCUMENTS

| | | |
|---|---|---|
| DE | 744918 | 1/1944 |
| GB | 1189210 | 4/1970 |
| GB | 1551492 | 8/1979 |
| GB | 2340438 | 2/2000 |

* cited by examiner

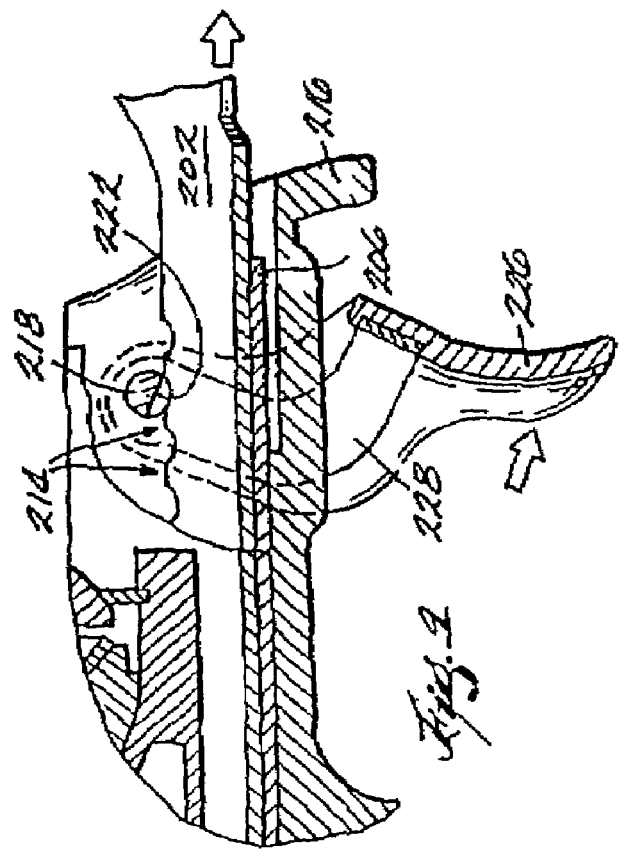
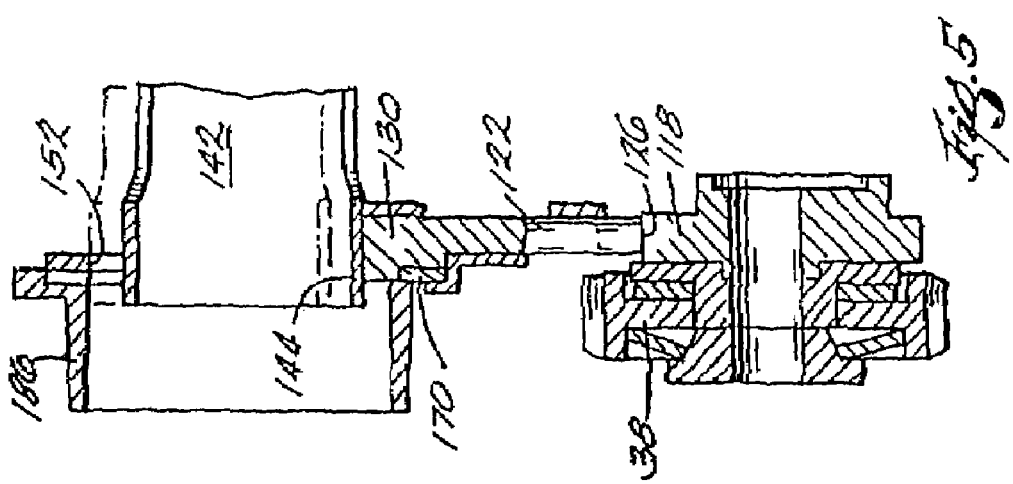

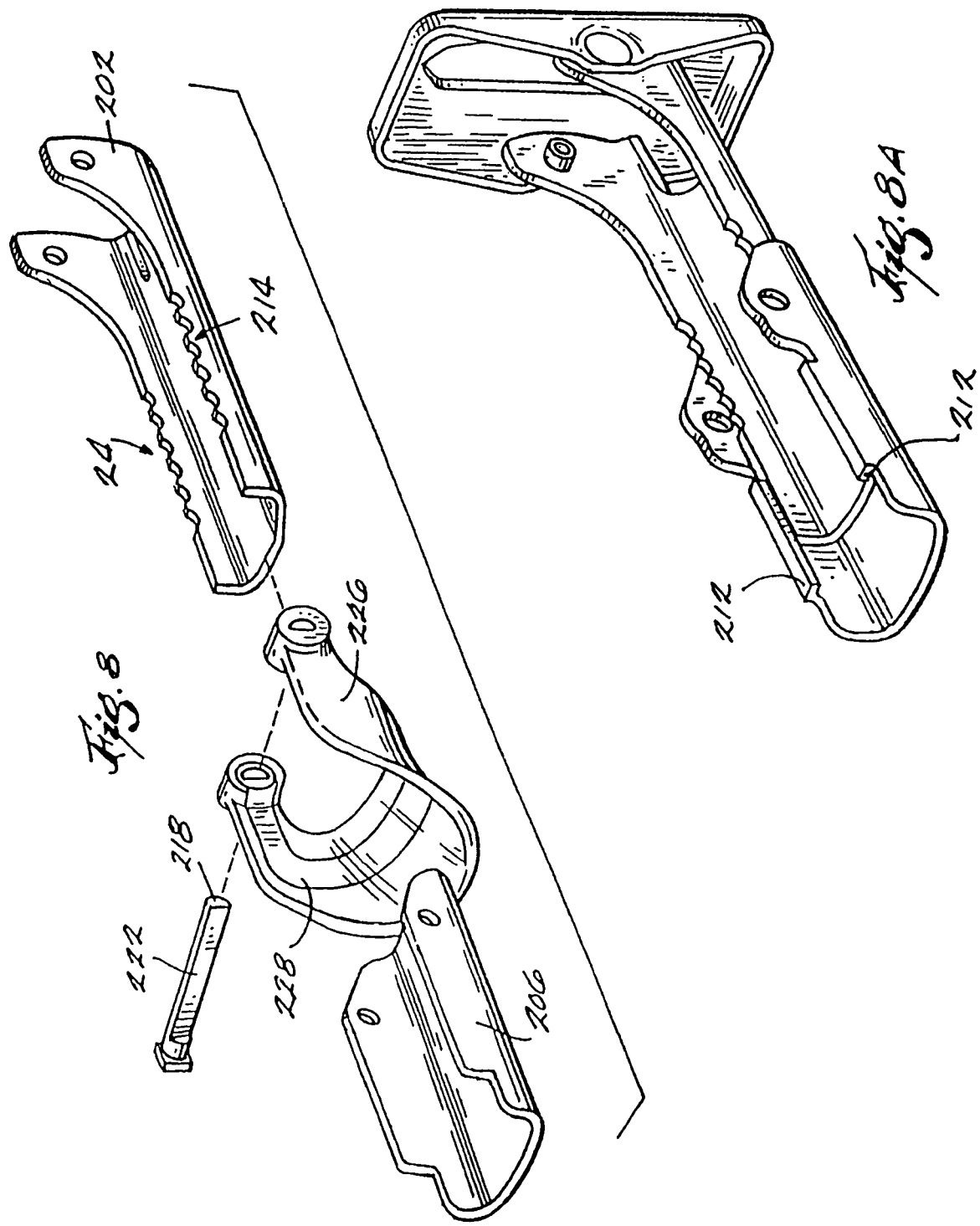

RECIPROCATING SAW

RELATED APPLICATIONS

This application is a continuation of U.S. patent application Ser. No. 09/892,096, filed Jun. 26, 2001 now U.S. Pat. No. 6,851,193, which is a divisional of U.S. patent application Ser. No. 09/133,728, filed Aug. 13, 1998 now U.S. Pat. No. 6,249,979.

BACKGROUND OF THE INVENTION

The present invention generally relates to reciprocating saws.

Reciprocating saws are used to cut a variety of objects made from a variety of materials, such as metal pipes, wood and dry wall. Such saws generally include a housing and a spindle mounted in the housing for reciprocating motion along an axis that is parallel to the longitudinal extent of the spindle. An electric motor provides power to the spindle through a mechanical reciprocating device that converts the rotary motion of a motor shaft to reciprocating motion. Such mechanical reciprocating devices can, for example, include an eccentric drive, as disclosed in U.S. Pat. No. 5,079,844, or a wobble plate drive, as disclosed in U.S. Pat. Nos. 5,025,562 and 5,050,307. In a typical wobble plate drive, the drive arm of a primary wobble plate has a spherical tip that engages a suitable bore defined in the reciprocating spindle. The drive can also include a secondary wobble plate having a drive arm with a spherical tip engaging a bore defined in a reciprocating counterweight.

In some reciprocating saws, the spindle reciprocates in an orbital motion, as opposed to a straight line reciprocating motion. The orbital motion is commonly characterized by a forward (i.e., in the cutting direction) motion of the saw blade as the saw blade is being retracted toward the saw on the cutting stroke, and a corresponding rearward (i.e., opposite the cutting direction) motion of the saw blade as the saw blade is being extended away from the saw on the return stroke. The result is a circuitous, or orbital, path of the saw blade. Such orbital motion is believed to improve the speed at which the saw cuts a workpiece by driving the saw blade into the workpiece during the cutting stroke and withdrawing the saw blade from the workpiece during the return stroke.

Orbital motion has been achieved in a number of different ways. For example, in U.S. Pat. Nos. 4,238,884 and 4,628,605, a forward force (in the cutting direction) is applied by a blade roller directly to the saw blade during the cutting stroke, and forward motion of the saw blade is accommodated by a forgiving interconnection between the spindle and the drive mechanism. In U.S. Pat. No. 5,212,887, the spindle reciprocates through a pivotally-mounted bushing, and the back end of the spindle is connected to an eccentric member that provides forward-rearward motion to the spindle. In U.S. Pat. Nos. 4,962,588 and 4,550,501, the back end of the spindle is moved forward-rearward by connection to a cam surface on a rotating gear. In U.S. Pat. No. 5,392,519 the back end of the spindle is moved forward-rearward by connection to an eccentric member formed on the drive gear.

In some orbital reciprocating saws, the orbital motion of the saw blade can be adjusted or disengaged. For example, U.S. Pat. No. 4,550,501 discloses a cam lever located on the side of the saw and operable to adjust the orbital motion of the saw blade. The cam lever is adjusted between a first position, in which the spindle is connected to the cam surface on the rotating gear, and a second position, in which the spindle is disconnected from a portion of the cam surface on the rotating gear.

To accommodate the orbital motion of the spindle, an orbital reciprocating saw typically includes a bearing arrangement for supporting the spindle. For example, U.S. Pat. No. 4,550,501 discloses a bearing block and a slidable bearing insert received within the bearing block. The bearing insert and the bearing block are dimensioned to provide a clearance space in the vertical direction to permit limited relative movement between the bearing insert and the bearing block to accommodate the orbital motion. A separate dust seal is mounted forwardly of the bearing assembly to prevent debris and other contamination from entering the saw housing.

In U.S. Pat. No. 5,212,887, an annular bearing member slidably receives the spindle or plunger assembly of the reciprocating saw. The bearing is received within an annular support mounted on the tool casing. The bearing and the bracket define spaces for receiving O-rings and clearance spaces. The O-rings and the clearance spaces cooperate to provide a swivel or swinging mounting for the plunger assembly to permit oscillatory movement of the plunger assembly. In other bearing arrangements, a spherical bearing may be provided, such as that shown in U.S. Pat. No. 3,945,120.

Some reciprocating saws further include a shoe secured relative to the housing to provide a flat surface for resting against the workpiece during cutting operations. The shoe is positioned near the saw blade, and the flat surface is usually perpendicular to the saw blade. The shoe typically includes an opening through which the blade extends.

In some reciprocating saws, the shoe may be adjustable relative to the length of the saw blade so that the shoe may be located in an optimum position for cutting operations. U.S. Pat. No. 5,421,091 discloses an adjustable guideshoe for a reciprocating saw. The adjustable guideshoe is mounted on a support bar which is received within an elongated slot formed in the nose section of the saw housing. The support bar includes a plurality of sets of opposed cam faces which are provided in side-by-side pairs spaced longitudinally along the bar. A manually operated plunger is mounted in the nose section and is spring biased toward the support bar. The plunger bar includes cam surfaces adapted for complementary wedging engagement with selected sets of cam faces on the support bar to achieve a self-locating function for the support and guideshoe mounted thereon.

SUMMARY OF THE INVENTION

The reciprocating saws described above have several independent problems.

For example, in a reciprocating saw with a wobble plate drive, the wobble plate drive arm and the spindle bore are machined with tight tolerances to extend the life of the saw and also to maintain acceptable noise levels. The required machining increases the cost of manufacturing the saw. Also, as the joint between the wobble plate drive arm and the spindle bore wears, the tight tolerance of the joint is lost so that wear of the saw increases. The loose joint between the drive arm and the spindle bore also causes increased noise.

One independent problem with a reciprocating saw having an orbital drive system in which cam member is fixed to the drive shaft is that the cam member is not replaceable or interchangeable without changing the attached drive shaft and/or drive gear. The lack of replaceability is a problem because the cam member is subject to wear due to the pressure applied during orbital cutting operations (i.e., when the saw blade is plunged into the workpiece). The lack of interchangeability is a problem because another cam member having a different cam configuration may provide a preferred orbital path for the saw blade for a given cutting operation.

One independent problem with the adjustment of an orbital reciprocating saw is that previous orbital actuation levers are typically located on one side of the tool. As a result, the operator can only activate the lever from that side of the saw.

One independent problem with the bearing assemblies that accommodate orbital motion in a reciprocating saw is that the bearing assemblies are difficult to assemble and increase the cost of manufacturing the saw. Another problem with some of these bearing assemblies is that they do not provide a good seal to prevent contaminants and debris from entering the saw housing.

One independent problem with some adjustable shoe assemblies for reciprocating saws is that these assemblies do not provide fine increments of adjustment to allow the shoe to be placed in the optimal position. Another problem with some of these adjustable shoe assemblies is that they require additional tools, such as a wrench or a key, for adjustment. Yet another problem with some of these shoe adjustment assemblies is that the adjustment mechanism or lever is accessible from only one side of the saw so that the operator can use only one hand to actuate the adjustment lever. A further problem with some of these shoe adjustment assemblies is that, while the lever is biased towards a locked position, the lever may be inadvertently operated by grasping the front portion of the housing, allowing the shoe to move relative to the housing during cutting operations.

The present invention provides a reciprocating saw that attempts to alleviate one or more problems relating to existing reciprocating saws. In one aspect, the invention provides a reciprocating saw that drives a saw blade in an adjustable orbital path. The saw comprises a housing, a motor supported by the housing and including a drive shaft, a spindle movably supported within the housing and having a front end adapted to support the saw blade through a cutting stroke and a return stroke, a wobble plate mounted on the drive shaft and connected to the spindle to reciprocally drive the spindle relative to the housing upon rotation of the drive shaft, an orbital drive assembly connected to the spindle and operable to selectively drive the saw blade in an orbital path, and an orbital adjustment assembly connected to the orbital drive assembly and operable to adjust the orbital path of the saw blade.

Preferably, the orbital drive assembly includes a cam member removably supported on the drive shaft. The cam member has an outer surface that is eccentric relative to the drive shaft axis. The cam member is engageable with the spindle to cause orbital movement of the saw blade upon rotation of the drive shaft.

The orbital drive assembly may further include a support member pivotably supported by the housing. The spindle is supported within the support member for reciprocal movement relative to the support member along the support member axis. The orbital drive assembly may further include a cam follower selectively engageable with the outer surface of the cam member and engageable with the support member. During rotation of the drive shaft, engagement of the cam follower with the cam member causes pivoting movement of the support member and orbital movement of the saw blade.

Preferably, the reciprocating saw further comprises a limiting portion engageable with the support member to limit pivoting movement of the support member in a direction perpendicular to the support member axis. Also, the orbital drive assembly preferably further includes a cam follower support member supported by the housing and providing the limiting portion.

The orbital adjustment assembly may be operable to selectively disengage the cam follower from the cam member during at least a portion of the rotation of the cam member to change the orbital path of the saw blade. The orbital adjustment assembly may include an orbital adjustment member supported by the housing for movement between a first position, in which a portion of the orbital adjustment member engages a portion of the cam follower during the portion of the rotation of the cam member to disengage the cam follower from the cam member, and a second position. Preferably, the orbital adjustment member has a cylindrical outer surface defining an axis of rotation, and the orbital adjustment member is rotatable about the axis between the first position and the second position.

The orbital adjustment assembly may further include a lever for moving the orbital adjustment member between the first and second positions, and the lever is preferably positioned so that it is engageable through the upper portion of the housing. In this manner, the orbital adjustment member is adjustable from either side of the tool by an operator.

The saw may further comprise a spherical bearing assembly supported by the housing. The spherical bearing assembly slidably supports the spindle for movement relative to the housing and supports the forward portion of the support member so that the support member and the spindle are pivotable relative to the housing. Preferably, the spherical bearing assembly includes a spherical sleeve supported between the housing and the support member and a bearing member supported between the support member and the spindle.

In another aspect, the invention provides a reciprocating saw having an adjustable shoe assembly. The shoe assembly includes a shoe for engaging a surface of the workpiece and a shoe support member supporting the shoe. The shoe support member is movably supported by the saw housing and defines a plurality of teeth along its length.

The shoe assembly also includes a locking member pivotally supported by the saw housing. The locking member defines a slot. The shoe assembly also includes a lever for pivoting the locking member between a locked position, in which the teeth are prevented from moving in the slot defined by the locking member so that the shoe support member is prevented from moving relative to the housing, and a release position, in which the teeth are movable in the slot so that the shoe support member is movable relative to the housing.

Preferably, the lever is operable from the lower portion of the saw housing so that it can be engaged by either hand of the operator. Also, during cutting operations, the operator preferably engages the lever so that the locking member is maintained in the locked position.

In yet another aspect, the invention provides a drive assembly for a reciprocating saw. The drive assembly comprises a spindle movably supported within the saw housing and defining a bore, a wobble plate mounted on the motor drive shaft and connected to the spindle to reciprocally drive the spindle relative to the saw housing upon rotation of the drive shaft, the wobble plate including a drive arm having an end receivable in the bore, and a wear compensating member positioned in the bore and engageable with the end of the drive arm. The drive assembly thus provides a wear compensating socket between the spindle and the drive arm of the wobble plate. Preferably, the wear compensating member is a spring.

One independent advantage of the present invention is that, because a wear compensating socket is provided in the spindle, the tolerance of the joint between the drive arm of the wobble plate and the spindle bore does not have to be as tightly machined. This reduces the cost of manufacturing the saw. Additionally, the wear compensating socket adjusts for wear between the drive arm and the spindle bore extending the life of the saw and reducing the noise level of the saw.

Another independent advantage of the present invention is that because the cam member is separate from the drive shaft, the cam member can be easily replaced or interchanged. This provides easy replacement of a worn cam member or interchangeability with different cam members to change the pattern of the orbital blade movement to affect the cutting performance of the reciprocating saw.

Yet another independent advantage of the present invention is that because the orbital actuation assembly is positioned at the top and center of the tool, the actuation assembly is operable with either hand. Further, the orbital actuation assembly maintains its center at the spindle axis allowing the orbital actuation lever to seal the opening through which the lever extends from the housing. In addition, because the orbital adjustment member or lock-out plate lifts the cam follower off of the cam member, the cam follower is prevented from rattling during reduced-orbit or no-orbit cutting operations. Also, the orbital actuation assembly provides multiple positions so that the amount of orbit in the path of the saw blade can be adjusted for different cutting operations.

A further independent advantage of the present invention is that the spherical bearing assembly allows the spindle to pivot freely during orbital cutting operations. Also, the bearing assembly provides a good seal that moves with the spindle to prevent dust and contamination from entering the housing. Additionally, the bearing assembly allows easy assembly of the reciprocating saw.

Another independent advantage of the present invention is that the adjustable shoe assembly allows finer increments of adjustment of the shoe relative to the housing. Also, the adjustable shoe assembly does not require additional tools for adjustment of the shoe. Further, the lever is operable from either side of the tool with one hand. In addition, during cutting operations, the lever is held by the operator in the locked position to reduce the chance of inadvertent unlocking of the shoe.

Other independent features of the invention will become apparent to those skilled in the art upon review of the following detailed description, claims and drawings.

DESCRIPTION OF THE DRAWINGS

FIG. 5 is a partial cross-sectional side view of the orbital drive assembly and the orbital adjustment assembly.

FIG. 6 is an exploded perspective view of the spindle, support member and bearing assembly of the reciprocating saw shown in FIG. 1.

FIG. 7 is a perspective view of a portion of the spindle shown in FIG. 6.

FIG. 8 is an exploded perspective view of the adjustable shoe assembly of the reciprocating saw shown in FIG. 1.

FIG. 8A is a perspective view of an alternative embodiment of a portion of the adjustable shoe assembly shown in FIG. 8.

FIG. 9 is a partial cross-sectional side view of the adjustable shoe assembly shown in FIG. 8 and illustrating the locking member in an unlocked position.

DETAILED DESCRIPTION OF THE PREFERRED EMBODIMENT

Figure 1:
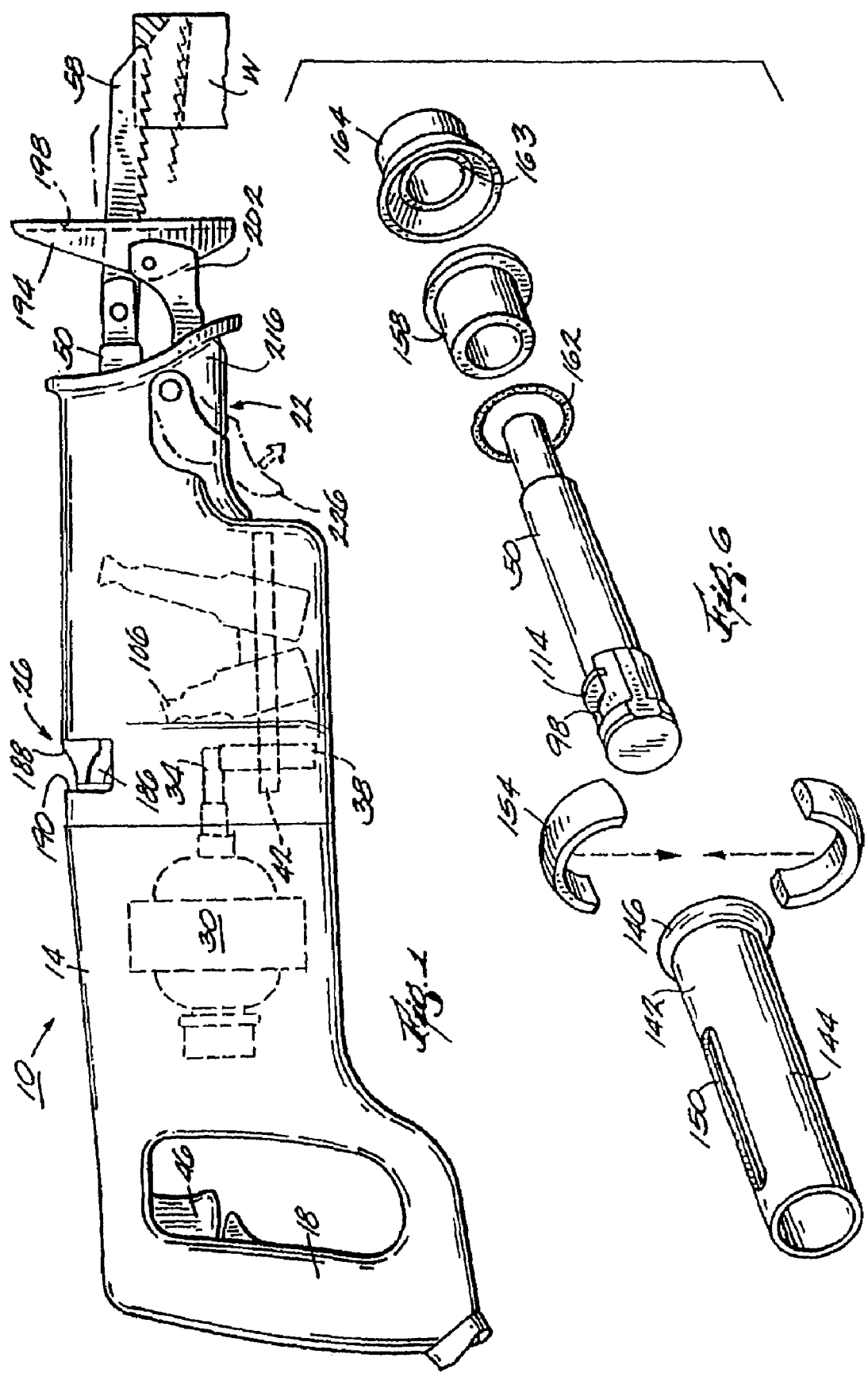
FIG. 1 is a side view of a reciprocating saw embodying the invention.

A reciprocating saw 10 embodying the present invention is illustrated in FIG. 1. The reciprocating saw 10 generally includes a main housing 14 having an operator's handle 18, a forward portion 22 opposite the handle 18, and an upper portion 26.

An electric motor 30 is supported by the housing 14. The motor 30 includes a drive pinion 34 that engages a gear 38 mounted on a drive shaft 42. The drive shaft 42 is rotatably mounted within the housing 14. A drive hub 44 is mounted on the drive shaft 42 and is connected to the gear 38. The hub 44 defines an off-center pocket 45. A switch 46 is located in the operator's handle 18 for energizing the motor 30 to rotate the drive shaft 42.

Figure 2:
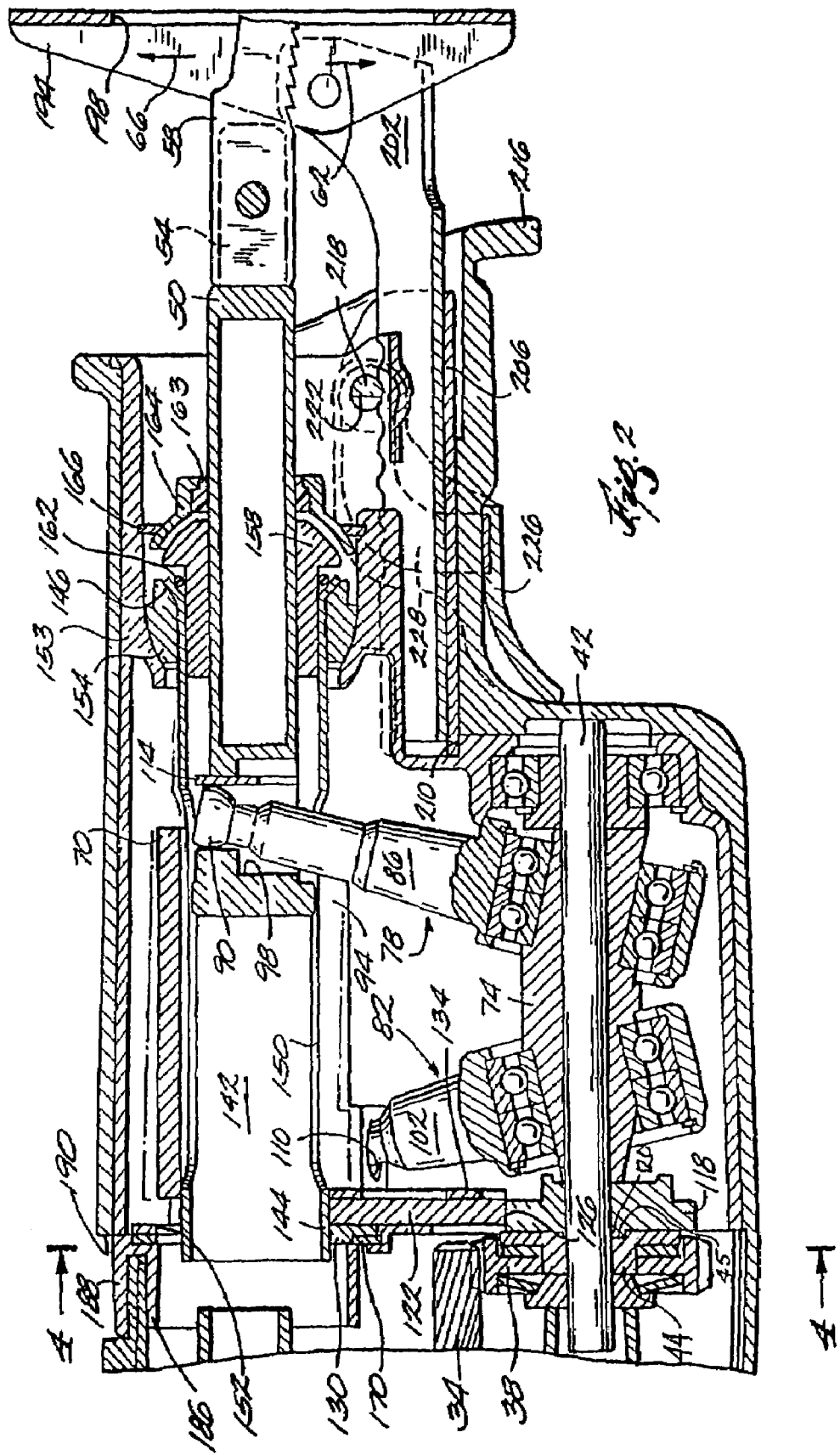
FIG. 2 is a partial cross-sectional side view of the reciprocating shown in FIG. 1.
Figure 3:
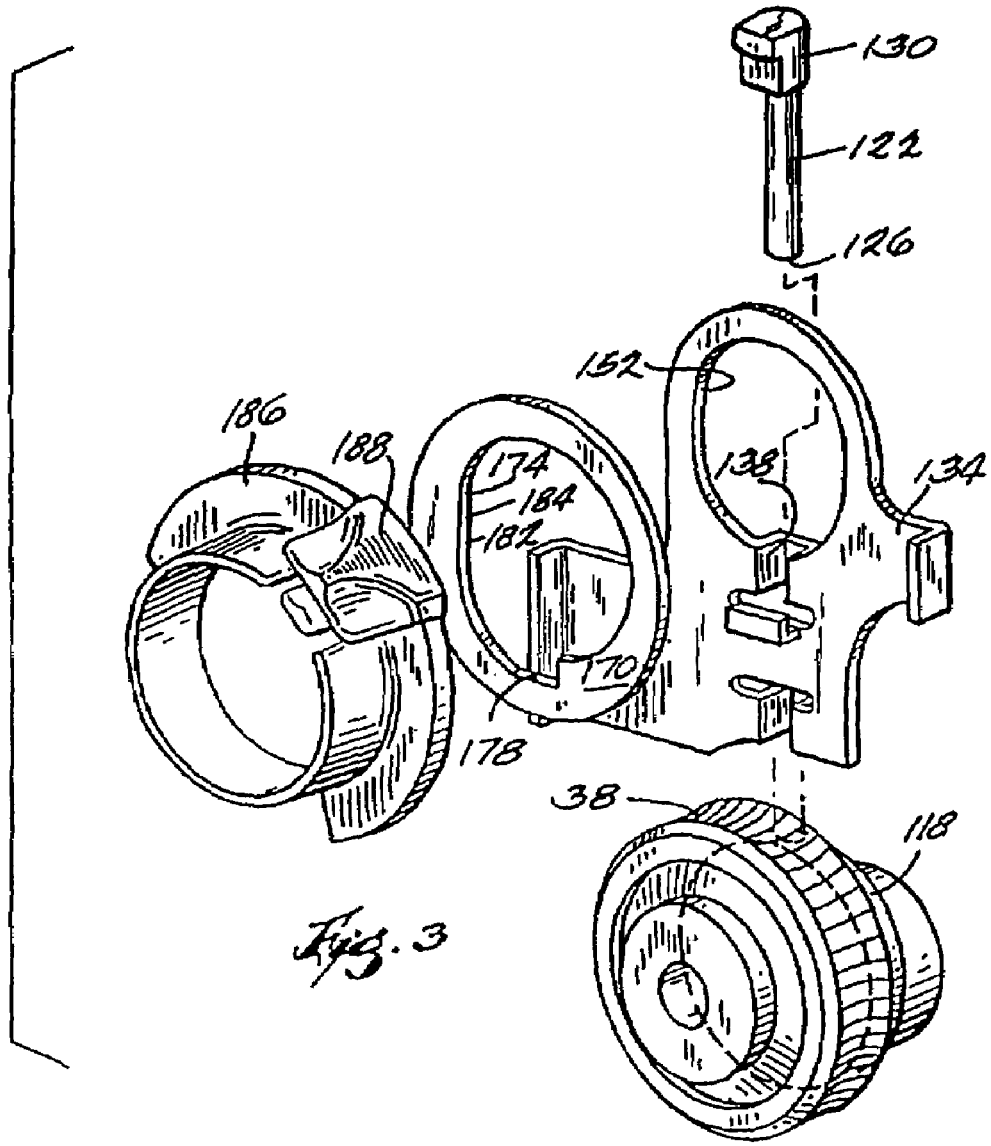
FIG. 3 is an exploded perspective view of the orbital adjustment assembly of the reciprocating saw shown in FIG. 1.

A spindle 50 (partially shown) is supported by the housing for reciprocating and pivoting movement (e.g., orbital movement) relative to the housing 14. As shown in FIG. 2, the spindle 50 includes a front end 54 that supports a saw blade 58, which is designed to cut in a cutting direction 62 (i.e., in the direction of the saw teeth) opposite a non-cutting direction 66. The spindle 50 generally reciprocates the saw blade 58 through a cutting stroke (usually toward the housing 14) and a return stroke (usually away from the housing 14).

A counterweight 70 is supported by the housing 14 for reciprocating and pivoting movement (e.g., orbital movement) relative to the housing 14. The counterweight 70 provides a vibration-reducing force that at least partially counteracts the forces created by movement of the spindle 50 and the saw blade 58.

The reciprocating saw 10 also includes (see FIG. 2) a reciprocating drive assembly for driving the spindle 50 and the counterweight 70. In the illustrated construction, the reciprocating drive assembly includes a wobble plate drive assembly having a wobble shaft 74 positioned over the drive shaft 42, and primary and secondary wobble plates 78 and 82 that are driven by the wobble shaft 74 in a conventional manner.

The primary wobble plate 78 includes a primary drive arm 86 having a ball end 90. The drive arm 86 extends through a slot 94 in the counterweight 70 so that the end 90 extends into a bore 98 defined in the spindle 50 to form a spindle socket. In this manner, the primary wobble plate 78 drivingly engages the spindle 50 for reciprocating movement.

The secondary wobble plate 82 includes a drive arm 102 having a ball end 106 (see FIG. 1) that extends into a bore 110 (see FIG. 2) defined in the counterweight 70 to form a counterweight socket. In this manner, the secondary wobble plate 82 drivingly engages the counterweight 70 for reciprocating movement.

As shown in FIGS. 2, 6, and 7, the illustrated spindle 50 includes a wear compensating member in the form of a spring 114 positioned in the forward portion of the bore 98. As shown in FIG. 2, the end 90 of the primary wobble plate 78 engages the spring 114 so that a relatively tight fit is formed in the spindle socket between the end 90 and the bore 98. This tight fit reduces wear on the spindle 50 and primary wobble plate 78 and also reduces noise caused by a loose fit between these components. Additionally, over the life of the reciprocating saw 10, the spring 114 compensates for any wear in the spindle socket between the spindle 50 and the primary wobble plate 78 to maintain a tight fit. In other constructions (not shown), a spring could similarly be used in the counterweight socket between the end 106 of the secondary wobble plate 82 and the bore 110 of the counterweight 70.

The reciprocating saw 10 also includes (see FIGS. 2–5) an orbital drive assembly for driving the spindle 50 in an orbital motion (e.g., reciprocating and pivoting motion). The orbital motion is characterized by a forward (i.e., in the cutting direction 62) motion of the saw blade 58 as the saw blade 58 is being retracted toward the saw housing 14 on the cutting stroke, and a corresponding rearward (i.e., in the non-cutting direction 66) motion of the saw blade 58 as the saw blade 58 is being extended away from the housing 14 on the return stroke. This results in a circuitous or orbital path of the saw blade 58.

The orbital drive assembly includes cam member 118 supported on the drive shaft 42 for rotation with the drive shaft 42. The cam member 118 has an outer surface that is eccentric with respect to the axis of the drive shaft 42 so that the outer surface of the cam member 118 rotates eccentrically about the axis of the drive shaft 42 as the drive shaft 42 rotates.

As shown in FIG. 2, a projection 120 on the cam member 118 engages in the pocket 45 on the hub 44 so that the cam member 118 does not rotate relative to the drive shaft 42 or relative to the gear 38. However, the cam member 118 is removable from the drive shaft 42 by sliding the cam member 118 off an end of the drive shaft 42. In this manner, the cam member 118 can be replaced if the cam member 118 becomes worn. Similarly, the cam member 118 can be interchanged with another cam member (not shown) having a different eccentric or cam configuration on its outer surface.

The orbital drive assembly also includes (see FIGS. 2–5) a cam follower 122. The cam follower 122 includes a lower portion 126 that is selectively engageable with the outer surface of the cam member 118. The cam follower 122 also includes head portion 130.

The cam follower 122 is supported (see FIG. 3) by a pin support member 134 secured to the housing 14. Specifically, the cam follower 122 is positioned within a pin support channel 138 defined by the support member 134. The cam follower 122 is supported by the support member 134 so that the cam follower 122 is movable relative to the support member 134 along the longitudinal axis of the cam follower 122. The channel 138 substantially prevents the cam follower 122 from rotating or moving laterally relative to the longitudinal axis of the cam follower 122. When the lower portion 126 of the cam follower 122 is engaged with the rotating cam member 118, the cam follower 122 reciprocates along the longitudinal axis of the cam follower 122.

The orbital drive assembly also includes (see FIGS. 2 and 4–5) a tube chassis 142 that is supported in the housing 14 for pivotal movement relative to the housing 14. The tube chassis 142 is generally cylindrical and has a hollow inner portion for receiving the spindle 50. The spindle 50 is supported by the tube chassis 142 for reciprocating movement along the longitudinal axis of the tube chassis 142. The tube chassis 142 has a rear portion 144 and a forward flanged portion 146 and defines (see FIGS. 2 and 6) a slot 150 through which the drive arm 86 of the primary wobble plate 78 extends to engage the spindle 50. The counterweight 70 is supported on the outer surface of the tube chassis 142 for reciprocating movement relative to the tube chassis 142.

In the illustrated construction, the head portion 130 of the cam follower 122 engages the rear portion 144 of the tube chassis 142. When the cam follower 122 reciprocates, the tube chassis 142 pivots relative to the housing 14 about the forward flanged portion 146 (see FIG. 2) of the tube chassis 142. Because the tube chassis 142 is positioned between the spindle 50 and the counterweight 70, the spindle 50 and the counterweight 70 pivot with the tube chassis 142. The pivoting movement of the tube chassis 142 and the spindle 50 in combination with the reciprocation of the spindle 50 causes the saw blade 58 to move in an orbital path.

Figure 4:
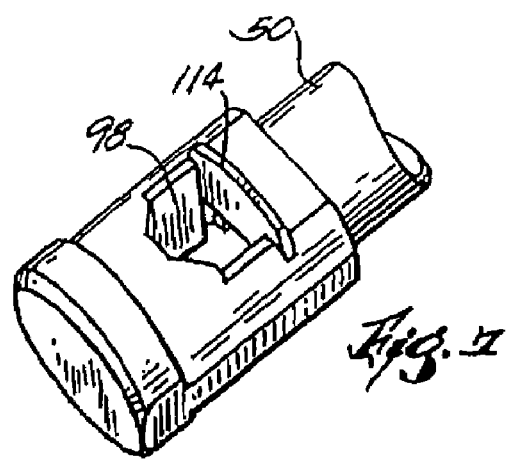
FIG. 4A is a partial cross-sectional view generally taken along line 4—4 in FIG. 2 and illustrating the orbital drive assembly and the orbital adjustment assembly in a full-orbit position.
FIG. 4B is a view similar to that in FIG. 4A and illustrating the orbital drive assembly and the orbital adjustment assembly in a reduced-orbit position.

As shown in FIGS. 2 and 4–5, the tube chassis 142 extends through a central opening 152 formed in the support member 134. The support member 134 limits the lateral movement of the tube chassis 142. In other constructions (not shown), a limiting portion may be provided by bosses or guides formed on the inner portion of the housing 14 to limit the lateral movement of the tube chassis 142.

The reciprocating saw 10 also includes (see FIGS. 2 and 6) a spherical bearing assembly to accommodate the pivotal movement of the spindle 50 and the tube chassis 142 relative to the housing 14. The spherical bearing assembly also seals an inner, forward portion 153 of the housing 14 to prevent debris from entering the housing 14 and adversely affecting the operation of the reciprocating saw 10.

The spherical bearing assembly includes a split spherical sleeve 154 captured between the forward flanged portion 146 of the tube chassis 142 and the inner, forward portion 153 of the housing 14. The spherical sleeve 154 has a spherical outer surface to accommodate pivoting movement of the tube chassis 142 relative to the housing 14.

The spherical bearing assembly also includes a spherical bearing member 158 positioned between the inner surface of the tube chassis 142 and the outer surface of the spindle 50. The bearing member 158 accommodates reciprocation of the spindle 50 relative to the tube chassis 142. The bearing member 158 also limits the forward movement of the spindle 50 relative to the tube chassis 142 so that the spindle 50 is retained within the tube chassis 142. An O-ring 162 (see FIG. 2) is positioned between the bearing member 158 and the inner surface of the forward flanged portion 146 of the tube chassis 142.

The spherical bearing assembly also includes a forward seal 163 sealingly engaging the spherical bearing member 158 and the spindle 50. A seal retainer plate 164 covers the seal 163 and a portion of the spherical bearing member 158. The seal retainer plate 164 has a spherical outer surface.

The spherical bearing assembly also includes a retaining member 166 engaging the housing 14 and the seal retainer plate 164 to retain the spherical bearing assembly, the tube chassis 142 and the spindle 50 within the housing 14. The spherical surface of the seal retainer plate 164 engages the inner surface of the retaining member 166 to accommodate pivoting movement of the spindle 50 relative to the retaining member 166 and relative to the housing 14.

The spherical bearing assembly improves the ease of manufacture and assembly of the reciprocating saw 10. To assemble this portion of the reciprocating saw 10, the bearing member 158 and the O-ring 162 are slid rearwardly into the tube chassis 142. The spindle 50 is slid forwardly through the tube chassis 142 and through the bearing member 158. The tube chassis 142 is then positioned in the housing 14 and slid through the inner, forward portion 153 of the housing 14.

The forward seal 163 and the seal retainer plate 164 are slid rearwardly onto the spindle 50 into engagement with the forward portion of the bearing member 158. The split spherical sleeve 154 is positioned around the forward flanged portion 146 of the tube chassis 142, and the tube chassis 142 is slid rearwardly to capture the spherical sleeve 154. Finally, the retaining member 2166 is locked into position against the seal retainer plate 164 to retain and seal the spherical bearing assembly, the tube chassis 142, and the spindle 50 within the housing 14.

In other constructions (not shown), the spherical bearing assembly may include a whole ring spherical sleeve rather than the split spherical sleeve 154. In such a construction, the whole ring spherical sleeve is positioned on the tube chassis 142, and the tube chassis 142 is slid rearwardly through the inner, forward portion 153 of the housing 14.

The reciprocating saw 10 also includes (see FIGS. 2–5) an orbital adjustment assembly for adjusting the orbital path of the saw blade 58. In the illustrated construction, the orbital path of the saw blade 58 is adjusted by controlling or limiting the pivoting movement of the tube chassis 142 and the spindle 50.

The orbital adjustment assembly includes an orbital adjustment member 170 supported by the housing 14 and the support member 134 for rotational movement about the rear portion 144 of the tube chassis 142. The adjustment member 170 has a generally cylindrical outer surface defining the rotational axis of the adjustment member 170. The support member 134 limits the downward movement of the adjustment member 170 and resists the downward force applied to the adjustment member 170 during cutting operations.

The adjustment member 170 includes (see FIGS. 3–4) a cam surface 174 having first, second and third cam portions 178, 182, and 184. The adjustment member 170 is positioned adjacent to the cam follower 122 so that portions of the cam surface 174 are selectively engageable with the head portion 130 of the cam follower 122.

The orbital adjustment assembly also includes (see FIGS. 1–5) an orbital release member 186 for rotating the adjustment member 170 relative to the cam follower 122. Specifically, the release member 186 is secured to the adjustment member 170 and is supported within the housing 14 for rotation about the axis of the adjustment member 170.

Figure 4B:
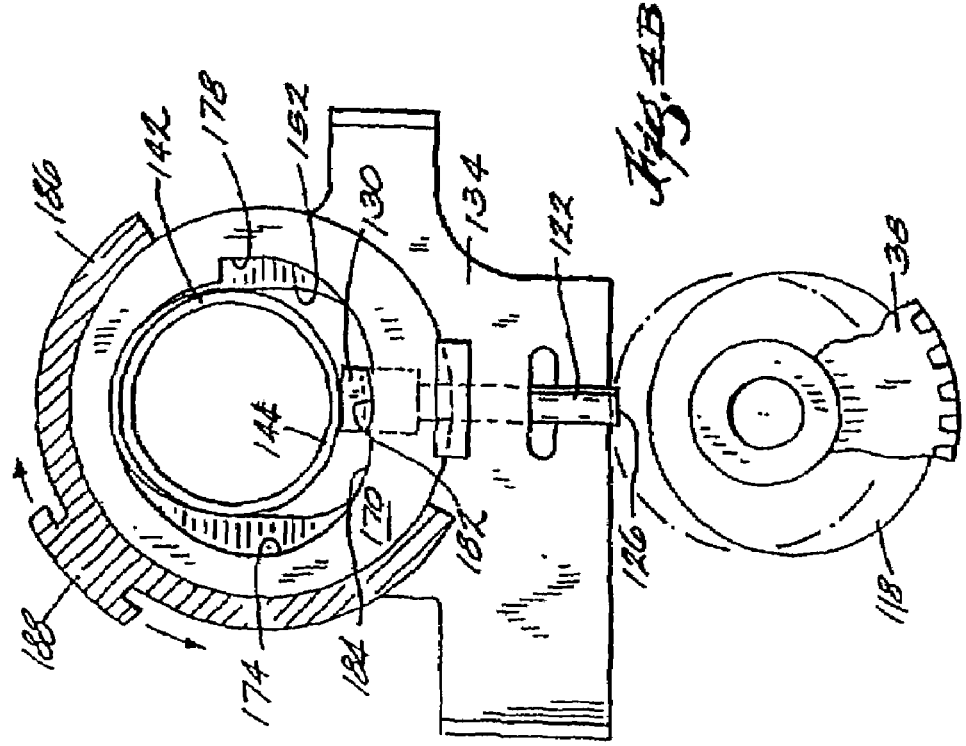
Figure 4A:
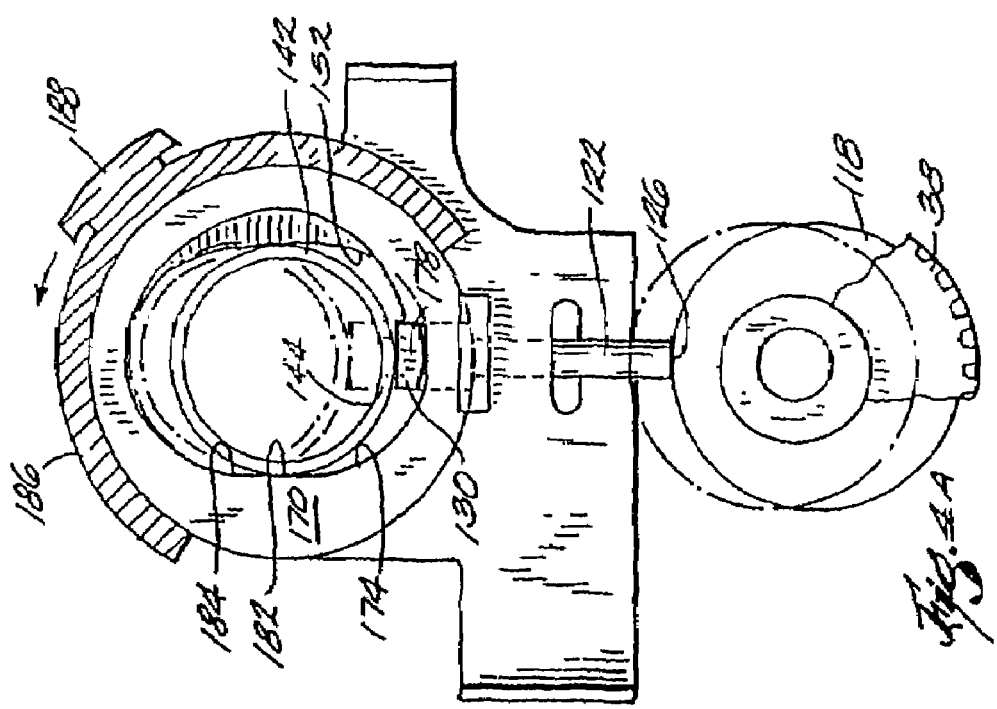

The release member or lever 186 includes (see FIGS. 1–4) a manually-operable portion 188 which extends through an opening 190 (see FIGS. 1–2) in the upper portion 26 of the housing 14 so that the manually-operable portion 188 can be engaged by the operator from either side of the housing 14. In this manner, the operator can use either hand to adjust the rotational position of the release member 186 and adjustment member 170. As explained more fully below, the release member 186 is operable to move the adjustment member 170 between a first or full-orbit position (shown in FIG. 4A), a second or reduced-orbit position (shown in FIG. 4B), and a third or no-orbit position.

The release member 186 also includes a first detent portion (not shown) formed on the manually-operable portion 188. The first detent portion engages a second detent portion (not shown) formed on the housing 14 when the release member 186 is in the first, second, or third position to hold the release member 186 in that selected position.

The reciprocating saw 10 also includes (see FIGS. 1, 2, 8, and 9) an adjustable shoe assembly including (see FIGS. 1–2) a shoe plate 194 having a surface for engaging a surface of a workpiece W. The shoe plate 194 defines an aperture 198 through which the saw blade 58 is extendable. The aperture 198 is dimensioned to accommodate the orbital path of the saw blade 58.

The adjustable shoe assembly also includes (see FIGS. 1, 2, 8, and 9) a shoe support member 202 pivotally connected to the shoe plate 194. The shoe support member 202 is movably supported by the housing 14 to adjust the position of the shoe plate 194 relative to the housing 14.

A shoe retaining plate 206 is supported in a slot 210 (see FIG. 2) defined in the housing 14 to form a channel in which the shoe support member 202 is movable. The retaining plate 206 supports the shoe support member 202 along at least two walls (i.e., the bottom wall and a side wall). In an alternative embodiment (see FIG. 8A), the retaining plate 206 includes hardened wear surfaces provided by contact portions 212 to form a channel which supports the shoe support member 202 on all four sides.

The shoe support member 202 includes (see FIGS. 2, 8, and 9) a plurality of pairs of teeth 214 spaced along the length of the shoe support member 202. One tooth 214 of each pair is formed on each lateral side of the shoe support member 202.

As shown in FIGS. 1, 2 and 9, a rubber boot 216 covers and seals the forward portion of the housing 14 and the shoe retaining plate 206. The boot 216 also provides an improved gripping surface for the operator.

The adjustable shoe assembly also includes a locking member 218 pivotably supported by the housing 14. The locking member 218 is generally cylindrical but includes an axially-extending flat surface 222. A shoe release lever 226 is pivotally supported on the lower, forward portion 22 of the housing 14 and is connected to the locking member 218 so that pivotal movement of the lever 226 causes pivotal movement of the locking member 218. In this location, an operator can engage the lever 226 from either side of the housing 14 with either hand. A metal insert 228 is co-molded with the lever 226 to provide additional strength to the lever 226.

The lever 226 is movable between a first or locked position (shown in FIG. 2) and a second or released position (shown in FIG. 9). In the locked position (FIG. 2), the locking member 218 is pivoted so that the locking member 218 engages the teeth 214. The rounded portion of the locking member 218 engages the forward rounded surface of each of a pair of teeth 214, and the flat surface 222 engages the adjacent pair of teeth 214. In this manner, the shoe support member 202 is substantially prevented from moving relative to the housing 14.

To adjust the position of the shoe plate 194 relative to the housing 14, the operator moves the lever 226 to the release position (FIG. 9). As the lever 226 is pivoted to the release position, the locking member 218 is pivoted relative to the shoe support member 202. In the release position (FIG. 9), the locking member 218 is pivoted so that the locking member 218 does not engage the teeth 214. The teeth 214 are movable beneath the flat surface 222 of the locking member 218. With the lever 226 maintained in the release position, the operator can adjust the shoe plate 194 relative to the housing 14 so that the shoe plate 194 is in an optimum position for cutting.

Once the shoe plate 194 is in the desired position, the lever 226 is pivoted to the locked position (FIG. 2), and the operator performs the cutting operation with the reciprocating saw 10. During cutting operations, the lever 226 is normally grasped by the operator in the locked position so that the locking member 218 will be maintained in this locked position.

The adjustable shoe assembly also includes a biasing member (not shown) to normally bias the lever 226 toward the locked position. The spring is preferably supported so that, as the lever 226 is moved to the release position, the spring moves over-center to bias the lever 226 toward the release position.

In operation of the reciprocating saw 10, the motor 30 is energized to rotate the drive shaft 42. The wobble shaft 74 rotates with the drive shaft 42 causing the primary wobble plate 78 to reciprocate the spindle 50 and causing the secondary wobble plate 82 to reciprocate the counterweight 70. The saw blade 58 reciprocates with the spindle 50.

Based on the operator's selection of the position of the adjustment member 170, the orbital drive assembly selectively causes orbital movement of the saw blade 58. In the full-orbit position (FIG. 4A), the cam follower 122 engages the outer surface of the cam member 118 throughout the rotation of the cam member 118. Engagement of the first cam portion 178 with the head portion 130 does not disengage the lower portion 126 of the cam follower 122 from the cam member 118. As a result, as the cam member 118 rotates, the cam follower 122 reciprocates, causing the tube chassis 142 and the spindle 50 to pivot as the spindle 50 reciprocates. This combination of reciprocating movement and pivoting movement causes the saw blade 58 to move in a full-orbit path defined by the cam configuration of the cam member 118.

In the reduced-orbit position (FIG. 4B), the second cam portion 182 engages the head portion 130 to disengage the lower portion 126 of the cam follower 122 from the cam member 118 during at least a portion of the rotation of the cam member 118. As a result, the cam follower 122 does not reciprocate during this portion of the rotation of the cam member 118. The tube chassis 142 and the spindle 50 are also thus not pivoted during this portion of the rotation of the cam member 118, limiting the orbital movement of the saw blade 58 to a reduced-orbit path.

In the no-orbit position, the third cam portion 184 engages the head portion 130 to disengage the cam follower 122 from the cam member 118 during the complete rotation of the cam member 118. As a result, the cam follower 122 does not reciprocate as the cam member 118 rotates, and the tube chassis 142 and the spindle 50 do not pivot. Thus, the saw blade 58 reciprocates in a straight, no-orbit path.

In other constructions (not shown), the orbital adjustment assembly may be operable to disengage the tube chassis 142 from the cam follower 122 to limit the pivoting movement of the tube chassis 142 and the spindle 50 and to thereby limit the orbital path of the saw blade 58. In yet other constructions (not shown), the cam surface 174 of the adjustment member 170 may be configured so that the orbital adjustment assembly has only a full-orbit condition and a no-orbit condition. Alternatively, the cam surface 174 may be configured so that the orbital adjustment assembly is infinitely adjustable between the full-orbit condition and the no-orbit condition.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relative art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A reciprocating saw comprising:
   a housing including a first grip surface for an operator's first hand and a second grip surface for an operator's second hand;
   a motor supported by the housing;
   a spindle movably supported by the housing, the spindle having an end adapted to support a saw blade;
   a drive mechanism connected between the motor and the spindle to reciprocally drive the spindle relative to the housing upon operation of the motor;
   a shoe for engaging a surface of a workpiece;
   a shoe support member supporting the shoe, the shoe support member being movably supported by the housing;
   a locking assembly operable to lock the shoe support member in a position relative to the housing; and
   a lever for operating the locking assembly between a locked condition, in which the shoe support member is locked in a position relative to the housing, and an unlocked condition, in which the shoe support member is movable relative to the housing, the lever being supported on the first grip surface such that, during operation of said saw, the operator's first hand engages the first grip surface and the lever and thereby maintains the lever in a locked position corresponding to the locked condition of the locking assembly;
   wherein the locking assembly includes a locking member engageable with the shoe support member, and wherein the lever is operable to move the locking member between a locked position, in which the locking member engages the shoe support member to lock the shoe support member in a position relative to the housing, and an unlocked position, in which the shoe support member is movable relative to the housing;
   wherein the locking member has a first end, a second end and a middle portion, and wherein the lever engages the first end and the second end of the locking member.

2. The reciprocating saw of claim 1 wherein the housing has an upper portion, a lower portion, and opposed side portions, and wherein the lever is operable from the lower portion of the housing.

3. The reciprocating saw of claim 1 wherein the first grip surface is selectively engageable by one of the operator's first hand and the operator's second hand, and wherein the lever is operable by the one of the operator's first hand and the operator's second hand engaging the first grip surface.

4. The reciprocating saw of claim 1 wherein the shoe support member defines therealong a plurality of teeth, wherein, in the locked position, the locking member engages the teeth so that the shoe support member is locked in a position relative to the housing, and wherein, in the unlocked position, the locking member does not engage the teeth and the shoe support member is movable relative to the housing.

5. The reciprocating saw of claim 1 wherein the locking member is pivotable between the locked position and the unlocked position.

6. The reciprocating saw of claim 1, wherein the lever includes a first lever member formed of a moldable material and a second lever member formed of a metallic material, the second lever member being molded with the first lever member.

7. The reciprocating saw of claim 6, wherein the second lever member defines a recess, one of the first end and the second end of the locking member engaging the recess.

8. The reciprocating saw of claim 7, wherein the second lever member defines a first recess and a second recess, the first end and the second end of the locking member respectively engaging the first recess and the second recess.

9. A reciprocating saw comprising: a housing;
a motor supported by the housing;
a spindle movably supported by the housing, the spindle having an end adapted to support a saw blade;
a drive mechanism connected between the motor and the spindle to reciprocally drive the spindle relative to the housing upon operation of the motor;
a shoe for engaging a surface of a workpiece;
a shoe support member supporting the shoe, the shoe support member being movably supported by the housing;
a locking assembly operable to lock the shoe support member in a position relative to the housing, the locking assembly including a locking member engageable with the shoe support member, the locking member having a first end, a second end and a middle portion; and
a lever operable to move the locking member between a locked position, in which the locking member engages the shoe support member to lock the shoe support member in a position relative to the housing, and an unlocked condition, in which the shoe support member is movable relative to the housing, the lever engaging the first end and the second end of the locking member.

10. The reciprocating saw of claim 9 wherein the locking member is pivotable between the locked position and the unlocked position.

11. The reciprocating saw of claim 9 wherein the lever includes a first lever member formed of a moldable material and a second lever formed of a metallic material, the second lever member being molded with the first lever member, the second lever member defining a recess, one of the first end and the second end of the locking member engaging the recess.

12. The reciprocating saw of claim 11 wherein the second lever member defines a first recess and a second recess, the first end and the second end of the locking member respectively engaging the first recess and the second recess.

13. The reciprocating saw of claim 9 and further comprising a retainer member supported by the housing and defining a channel, the shoe support member being movable in the channel, wherein the retainer member defines a first opening and a second opening respectively receiving the first end and the second end of the locking member.

* * * * *